(12) United States Patent
Tanno et al.

(10) Patent No.: US 7,665,495 B2
(45) Date of Patent: Feb. 23, 2010

(54) PNEUMATIC TIRE

(75) Inventors: Atsushi Tanno, Hiratsuka (JP); Hiroshi Yamauchi, Tokyo (JP); Yasuji Akiyoshi, Tokyo (JP)

(73) Assignees: The Yokohama Rubber Co, Ltd., Tokyo (JP); Mitsubishi Jidosha Kogyo Kabushiki Kaisha, Tokyo (JP)

(*) Notice: Subject to any disclaimer, the term of this patent is extended or adjusted under 35 U.S.C. 154(b) by 323 days.

(21) Appl. No.: 10/590,907

(22) PCT Filed: Mar. 8, 2005

(86) PCT No.: PCT/JP2005/003956

§ 371 (c)(1),
(2), (4) Date: Aug. 28, 2006

(87) PCT Pub. No.: WO2005/087515

PCT Pub. Date: Sep. 22, 2005

(65) Prior Publication Data

US 2007/0175559 A1  Aug. 2, 2007

(30) Foreign Application Priority Data

Mar. 12, 2004  (JP) ............................. 2004-070255

(51) Int. Cl.
*B60C 19/00* (2006.01)
*B60C 5/00* (2006.01)

(52) U.S. Cl. ................. 152/450; 152/154.1; 152/155

(58) Field of Classification Search ................ None
See application file for complete search history.

(56) References Cited

U.S. PATENT DOCUMENTS

| 565,451 A * | 8/1896 | Gregory ................. 152/158 |
| 2003/0188817 A1* | 10/2003 | Yukawa et al. ........... 152/381.6 |
| 2004/0066083 A1 | 4/2004 | Tsihlas |

FOREIGN PATENT DOCUMENTS

| JP | 62-216803 | | 9/1987 |
| JP | 2002178712 | * | 6/2002 |
| JP | 2003-226104 | | 8/2003 |
| JP | 2004-276809 | | 10/2004 |
| JP | 2004-291905 | | 10/2004 |
| WO | WO 02/85648 | | 10/2002 |

* cited by examiner

*Primary Examiner*—Justin Fischer
(74) *Attorney, Agent, or Firm*—Greer, Burns & Crain, Ltd.

(57) ABSTRACT

Disclosed is a pneumatic tire enabling to even a weight balance thereof in a tire circumferential direction in realizing reduction of cavity resonance noise by using an annular object having cross-sectional areas which vary depending on locations in the tire circumferential direction. The pneumatic tire of the present invention is one in which an annular object having cross-sectional areas which vary depending on locations in the tire circumferential direction is mounted on an inner surface of a tread portion. In the pneumatic tire, the annular object is formed by partially applying compression forming to a porous material member having a density of 5 to 70 kg/m³ and having an uniform cross-sectional shape in the tire circumferential direction.

9 Claims, 2 Drawing Sheets

PNEUMATIC TIRE

TECHNICAL FIELD

The present invention relates to a pneumatic tire in which reduction of cavity resonance noise is pursued by using an annular object having cross-sectional areas which vary depending on locations of the tire in a circumferential direction thereof More specifically, the present invention relates to a pneumatic tire enabling to even a weight balance thereof in the tire circumferential direction.

BACKGROUND ART

In a pneumatic tire, one of causes for generating noise is cavity resonance noise resulting from vibration of air filled in the tire. This cavity resonance noise is generated due to the vibration of air inside the tire, the vibration being caused by a tread portion vibrating due to irregularities of a road surface, when the tire is rolled.

As a method of reducing noise caused by a cavity resonance phenomenon as described above, it has been proposed that a time period during which resonance occurs at a single resonance frequency is reduced by having cross-sectional areas of a cavity portion, which is formed between a tire and a rim of a wheel, varied in a tire circumferential direction (for example, refer to Patent Document 1). Furthermore, in order to realize variations in cross-sectional area of the cavity portion at regular intervals, it has been proposed that a plurality of objects are mounted on an inner surface of the tire by using an annular jig (for example, refer to Patent Document 2).

In the above methods, however, the plurality of objects have to be arranged in locations facing each other inside the cavity portion, and therefore, it is difficult to even a weight balance of the tire in the tire circumferential direction. As a result, there is a problem that uniformity of the pneumatic tire is deteriorated.

[Patent Document 1] Japanese patent application Kokai publication No. 2001-113902

[Patent Document 2] Japanese patent application Kokai publication No. 2003-226104

DISCLOSURE OF THE INVENTION

An object of the present invention is to provide a pneumatic tire enabling to even a weight balance of the tire in a circumferential direction thereof in pursuing reduction of cavity resonance noise by using an annular object having cross-sectional areas which vary depending on locations in the tire circumferential direction.

A pneumatic tire according to the present invention for the purpose of achieving the above object is a pneumatic tire, in which an annular object having cross-sectional areas which vary depending on locations in the tire circumferential direction is mounted on an inner surface of a tread portion. The pneumatic tire is characterized in that the annular object is formed by partially applying compression forming to a porous material member having a density of 5 to 70 kg/m³ and having an uniform cross-sectional shape in the tire circumferential direction.

In the present invention, in pursuing reduction of the cavity resonance noise by using the annular object having the cross-sectional areas which vary depending on locations in the tire circumferential direction, the annular object having the cross-sectional areas which thus vary is formed by using the porous material member which has a density of 5 to 70 kg/m³, and which has an uniform cross-sectional shape in the tire circumferential direction, and by partially applying compression forming to the porous material member. Accordingly, if a weight per unit length of the porous material member in the tire circumferential direction is beforehand evened out, this makes. it possible to provide the porous material member with a desired change in cross-sectional area while a weight balance of the tire in the tire circumferential direction is evened.

Incidentally, an annular object having a structure similar to the one described above can be obtained also by previously preparing porous material members of plural shape types, and jointing these porous material members to one another in the tire circumferential direction, the shape types being varied only in cross-sectional area while weights per unit length in the tire circumferential direction are the same. In this case, however, an increase in manufacturing costs is incurred because the porous material members of the plural shape types need to be prepared, and additionally because a process of jointing the porous material members to one another is required. In addition, if the porous material members are jointed to one another by using an adhesive agent or the like, any jointed portion thereof are likely to become a starting point of destruction.

In contrast to this, an increase in manufacturing costs can be avoided in the present invention, because it is possible to use a porous material member of a single shape type and there is no need to joint a number of porous material members to one another. Furthermore, in the present invention, jointed portions of porous material members can be reduced in number, whereby there is an advantage that durability of the annular object is enhanced.

In the present invention, no specific limitation is imposed on a method of applying compression forming to the porous material member. For example, a constraining member for maintaining portion of the porous material member in a compressed state can be attached to each compressed portion, each compressed portion of the porous material member can be formed by thermal fusion, or each compressed portion of the porous material member can be formed by hot-pressing. In particular, the compression forming by hot-pressing has a high processing precision, and can be completed in a short time.

It is preferable that a range of variations in weight per unit length of the porous material member in the tire circumferential direction be 0 to 2%. By thus diminishing the range of variations in weight per unit length of the porous material member in the tire circumferential direction, the evening out of the weight balance is more surely achieved.

It is preferable that the difference between the maximum value Smax and the minimum value Smin of the cross-sectional areas of the porous material member after the compression forming be not less than 10% of the cross-sectional area of the cavity portion formed between the tire and a rim of a wheel. By thus enlarging the difference between the maximum value Smax and the minimum value Smin of the cross-sectional areas of the porous material member after the compression forming, an effect of reducing cavity resonance noise is enhanced.

It is preferable that the maximum value Tmax and the minimum value Tmin of the thicknesses of the porous material member after the compression forming satisfy $T_{max} \geq 10$ mm, and $T_{min} \geq 1$ mm at the same time. By satisfying $T_{max} \geq 10$ mm, the effect of reducing cavity resonance noise is enhanced, and by satisfying $T_{min} \geq 1$ mm, it is possible to obtain an optimal elasticity for the annular object formed of the porous material member to maintain a shape thereof fitted along an inner surface of the tire.

BEST MODES FOR CARRYING OUT THE INVENTION

Hereinbelow, configurations of the present invention will be described in detail with reference to the accompanying drawings.

Figure 1:
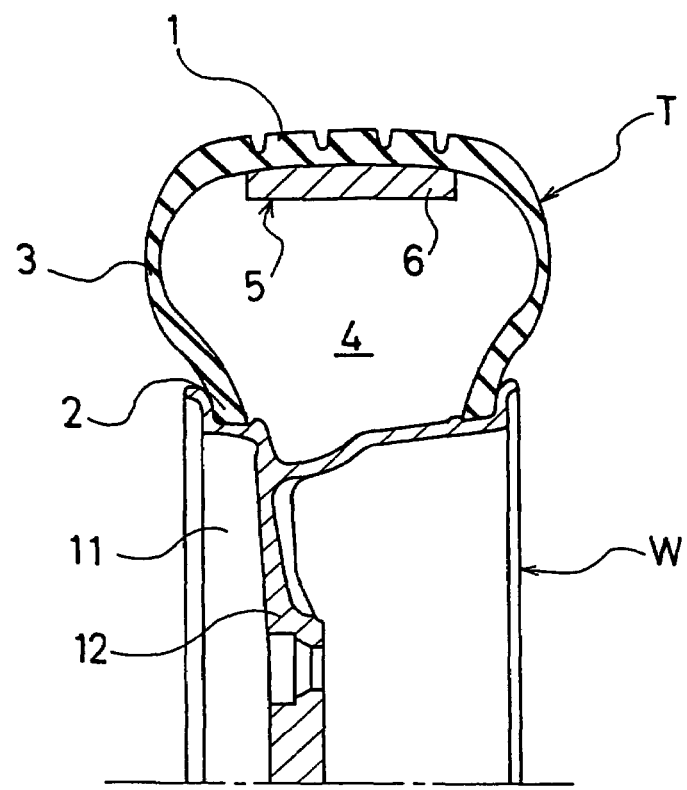
FIG. 1 is a meridional cross-sectional view showing a pneumatic tire of an embodiment of the present invention.
Figure 2:
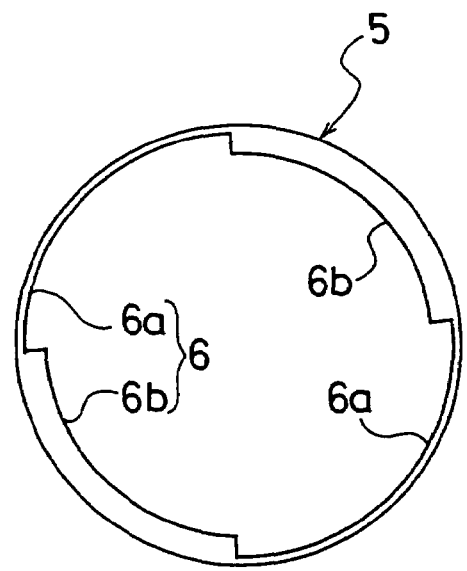
FIG. 2 is a side view showing an annular object of the present invention.
Figure 3:
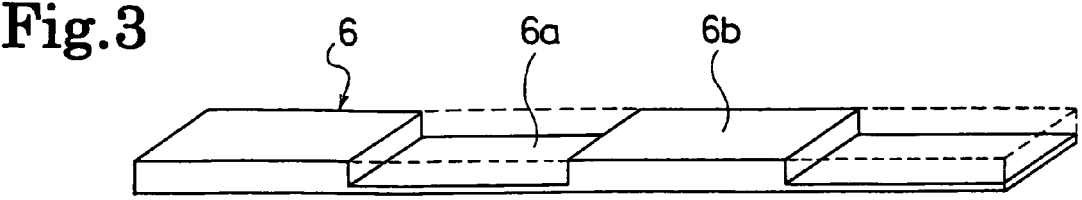
FIG. 3 is a perspective view showing a porous material member of the present invention.

FIG. 1 shows a pneumatic tire of an embodiment of the present invention, FIG. 2 shows an annular object of the present invention, and FIG. 3 shows a porous material member of the present invention. In FIG. 1, the pneumatic tire T includes a tread portion 1, a pair of right and left bead portions 2, and side wall portions 3 connecting the tread portion 1 to the respective bead portions 2. On the other hand, a wheel W is composed of a rim 11 for having the bead portions 2, 2 of the tire T mounted thereon, and a disk 12 coupling the rim 11 with an unillustrated axle shaft. Additionally, when the tire T is mounted on the wheel W. a cavity portion 4 is formed between the tire T and the wheel W.

In the abovementioned cavity portion 4, on an inner surface of the tread portion 1, an annular object 5 having cross-sectional areas which vary depending on locations in a circumferential direction of the tire is mounted. As shown in FIG. 2, the annular object 5 is configured to have repeated cycles of increase and decrease in cross sectional area, the cycles each being equal to, for example, one-forth of a circumference of the tire. Thereby, resonance frequencies are changed along with rotation of the tire T, and a time during which resonance occurs at a single resonance frequency is reduced, whereby cavity resonance noise is reduced.

The annular object 5 is obtained, as shown in FIG. 3, by partially applying compression forming to a porous material member 6. The porous material member 6 as a starting material has a uniform cross-sectional shape in the tire circumferential direction as indicated by dashed lines. Note that, because the porous material member 6 is processed into an annular shape in the tire circumferential direction, the longitudinal direction of the porous material member 6 corresponds to the tire circumferential direction in FIG. 3. The porous material member 6 having the uniform cross-sectional shape is partially processed by compression using an appropriate forming method, whereby alternate series of compressed portions 6a and uncompressed portions 6b are formed in the porous material member 6 in the tire circumferential direction. That is, if a weight per unit length of the porous material member 6 as a starting material in the tire circumferential direction is beforehand evened, it is possible to provide desired changes in cross-sectional area while a weight balance of the tire in the tire circumferential direction is evened.

In manufacturing the annular object 5, it is only necessary to use the porous material member 6 of the single shape type and form the porous material member 6 into the annular shape by jointing both ends thereof to each other after the compression forming. Therefore, manufacturing costs can be kept low. Furthermore, since the number of joints of the porous material member 6 is small, durability of the annular object 5 can be enhanced.

The porous material member 6 has a density (apparent density) of 5 to 70 kg/m$^3$. If the density thereof is less than 5 kg/m$^3$, form stability of the object 5 mounted on the inner surface of the tread portion 1 is reduced. By contrast, if the density thereof exceeds 70 kg/m$^3$, it becomes a cause of a weight increase. As a material for the porous material member 6, resin foam can be used, and in particular, it is preferable that polyurethane foam be used.

It is favorable that a range of variations in weight per unit length of the porous material member 6 in the tire circumferential direction be 0 to 2%. If this range of variations in weight exceeds 2%, it becomes difficult to even the weight balance. When the porous material member 6 is cut into pieces at intervals of 10 to 15 cm in the tire circumferential direction, and the weights of each cut piece thereof is measured, and the weight is then mathematically divided by a length of the each cut piece to obtain a weight per unit length thereof in the tire circumferential direction, the range of variations in weight is defined as a rate of variations of the weights per unit length of the respective cut pieces to the smallest value of the weights per unit length.

It is favorable that the difference (Smax−Smin) between the maximum value Smax and the minimum value Smin of the cross-sectional areas of the partially compressed porous material member 6 be not less than 10% of a cross-sectional area of the cavity portion 4 formed between the tire and the rim of the wheel. It is more preferable that the difference is 10 to 40% thereof. If the difference (Smax−Smin) is less than 10% of the cross-sectional area of the cavity portion 4, an effect of reducing cavity resonance noise decreases. Both the cross-sectional areas of the porous material member 6 after the compression forming, and the cross-sectional area of the cavity portion 4 are cross-sectional areas taken along a meridional cross section of the tire. Additionally, the rim mentioned here is a standard rim specified in the JATMA Year Book (the year 2003 version).

Additionally, it is favorable that the maximum value Tmax and the minimum value Tmin of the thicknesses of the partially compressed porous material member 6 satisfy Tmax≧10 mm, and Tmin≧1 mm at the same time. If the maximum value Tmax is less than 10 mm, the effect of reducing cavity resonance noise decreases. However, if the maximum value Tmax exceeds 30 mm, work of installing the object 5 to the tire becomes difficult. Thus, it is desirable that 10 mm≦Tmax≦30 mm is satisfied. On the other hand, if the minimum value Tmin is less than 1 mm, it becomes difficult to obtain an optimal elasticity for the annular object 5 formed of the porous material member 6 to maintain a shape fitted to the inside surface of the tire. It is favorable that the upper limit of the minimum value Tmin is 5 mm. Accordingly, it is desirable that 1 mm≦Tmin≦5 mm be satisfied.

Figure 4:
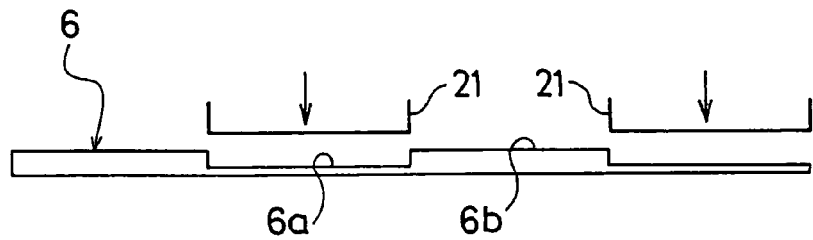
FIG. 4 is a side view showing one example of a method of applying compression forming to the porous material member by hot-pressing.
Figure 5:
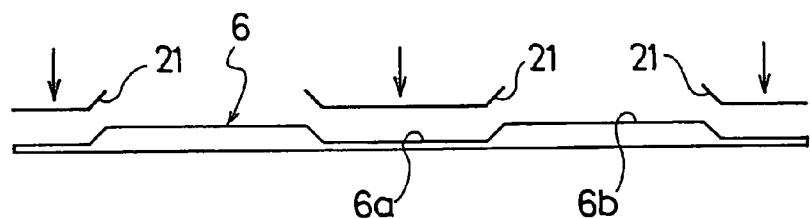
FIG. 5 is a side view showing another example of a method of applying compression forming to the porous material member by hot-pressing.

Next, a method of applying compression forming to a porous material member in the present invention will be described. FIGS. 4 and 5 are views each showing a method of applying compression forming to a porous material member by hot-pressing.

In FIG. 4, the compressed portions 6a of the porous material member 6 are formed by hot pressing. That is, by pressing heated press molding dies 21 against parts of the porous material member 6 having a uniform cross-sectional shape in the tire circumferential direction, the compressed portions 6a are formed. Although conditions for the hot-pressing depend on material properties of the porous material member 6, the conditions are favorable that they are set at a temperature of 100 to 170° C. and at a pressing time of 5 to 120 seconds, for example. In addition, in a case where, as shown in FIG. 5, angles of the press molding dies 21 are made not right-angled but oblique, stress concentration on a boundary portion between each of the compressed portions 6a and corresponding one of the uncompressed portions 6b adjacent thereto, which are formed thereby, can be relaxed.

Figure 6:
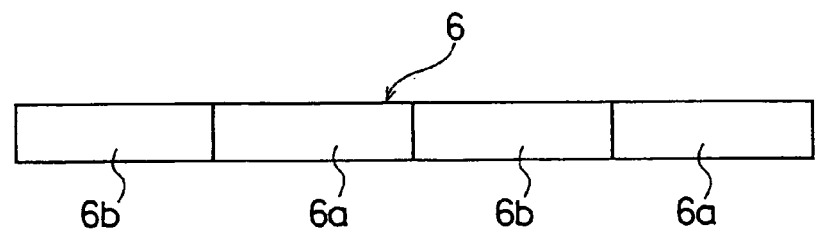
FIG. 6 is a plan view showing one example of the porous material member to which compression forming is applied by hot-pressing.
Figure 7:
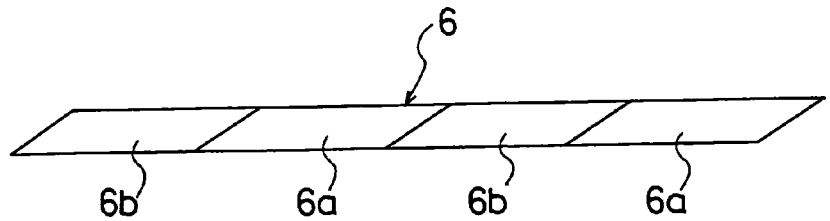
FIG. 7 is a plan view showing another example of the porous material member to which compression forming is applied by hot-pressing.

FIGS. 6 and 7 are views each showing a state of the porous material member, which has been compressed by hot-pressing, the state being observed when viewed from the above. In FIG. 6, the compressed portions 6a and the uncompressed portions 6b are formed into rectangles. On the other hand, in FIG. 7, the compressed portions 6a and the uncompressed portions 6b are formed into parallelograms. In the latter case, a force received from the tire when the tire touches the ground is dispersed into both the compressed portions 6a and the uncompressed portions 6b, durability of the annular object 5 formed of the porous material member 6 can be enhanced.

The above described compression forming by hot-pressing is an optimal method because it has a high forming precision, and because it can be completed in a short time. In the present invention, however, it is possible to adopt other methods for compression forming of the porous material member. For example, by compressing parts of the porous material member, it is possible to seam the parts by using a sewing machine, or to fix the parts by using a staple or the like, while the parts are in the compressed state. That is, it is possible to attach, to each of the compressed portions of the porous material member, a constraining member (string or staple) for maintaining the compressed state. Additionally, parts of the porous material member may be thermally fused by using a heat source such as hot air, infrared rays, a hot iron plate or high-temperature steam. That is, the compressed portions of the porous material member may be formed by thermal fusion.

The preferred embodiment of the present invention has been described in detail hereinabove. It should be understood that various modifications to, substitutions for, and replacements with, the preferred embodiment can be carried out as long as the modifications, the substitutions, and the replacements do not depart from the spirit and the scope of the present invention defined by the attached scope of claims.

EXAMPLES

Tires of Conventional Example, Example, and Comparative Example were respectively manufactured. These tires are pneumatic tires each having a tire size of 215/60R16, which are only different from one another in conditions for the cavity portion. The tire of Conventional Example is one where nothing was disposed in a cavity portion thereof. The tire of Example is one where, by configuring an annular object (refer to FIG. 2) having cross-sectional areas which vary by partially applying compression forming to a porous material (polyurethane foam) member with a density of 20 kg/m³ and with an uniform cross-sectional shape in the tire circumferential direction, this annular object was mounted on an inside surface of a tread portion. While the difference between the maximum value Smax and the minimum value Smin of the cross-sectional areas of the porous material member was set at 16% of the cross-sectional area of the cavity portion of the tire, the maximum value Tmax and the minimum value Tmin of thicknesses of the porous material member were set at 20 mm and 4.0 mm, respectively. The tire of Comparative Example is one where an annular object, which has the substantially same configuration as the annular object in the tire of Example, was mounted on an inner surface of a tread portion. The annular object here was obtained by jointing porous material (polyurethane foam) members in the tire circumferential direction, the members being composed of two pieces of one shape type, and the other two pieces of the other shape type.

With respect to each of these tires of Conventional Example, Example and Comparative Example, cavity resonance noise was assessed. That is, each of these test tires was mounted on a wheel having a rim size of 16×16.5 JJ, and was set to have a pneumatic pressure of 210 kPa. Then the each tire was installed onto an FR sedan having an engine displacement of 3000 cc, and a peak level (car interior sound in dB) of cavity resonance noise was measured for each tire. Furthermore, with respect to each of the tires of Example and Comparative Example, a mileage traveled until the annular object formed of the porous material member or members became destroyed was measured to be used as an indicator for durability. Results of the assessment are shown in index numbers where the mileage traveled with the Comparative Example is set at 100. It is indicated that the larger this index number is, the more excellent the durability is. Table 1 shows these results.

TABLE 1

|  | Conventional Example | Comparative Example | Example |
|---|---|---|---|
| Cavity resonance noise (Car interior sound (dB)) | 53 | 49 | 49 |
| Durability of porous material member | — | 100 | 112 |

As can be found from this Table 1, the tire of Example has less cavity resonance noise than the tire of Conventional Example, and is more excellent in durability than the tire of Comparative Example. It goes without saying that a weight balance is even in the tire of Example, because the annular object is provided with changes in cross-sectional shape by applying compression forming to the single porous material member.

What is claimed is:

1. A pneumatic tire, in which an annular object having cross-sectional areas which vary depending on locations in a circumferential direction of the tire is mounted on an inner surface of a tread portion, wherein the annular object is formed by partially applying compression forming to a porous material member, which has a density of 5 to 70 kg/m³, and which has a uniform cross-sectional shape in the tire circumferential direction, wherein a range of variations in weight per unit length of the porous material member in the circumferential direction of the tire is 0 to 2%, wherein the compressed portions and uncompressed portions of the porous material member are alternately arranged in the circumferential direction.

2. The pneumatic tire according to claim 1, wherein a constraining member for maintaining a compressed state is attached to each compressed portion of the porous material member.

3. The pneumatic tire according to claim 1, wherein each compressed portion of the porous material member is formed by thermal fusion.

4. The pneumatic tire according to claim 1, wherein each compressed portion of the porous material member is formed by hot-pressing.

5. The pneumatic tire according to any one of claims 1 to 4, wherein a difference between a maximum value Smax and a minimum value Smin of the cross-sectional areas of the porous material member after the compression forming is not less than 10% of a cross-sectional area of a cavity portion formed between the tire and a rim of a wheel.

6. The pneumatic tire according to any one of claims 1 to 4, wherein a maximum value Tmax and a minimum value Tmin of the thicknesses of the porous material member after the compression forming satisfy Tmax≧10 mm, and Tmin≧1 mm at the same time.

7. The pneumatic tire according to claim 1, wherein a shape of each of the compressed portions and the uncompressed portions of the porous material member is formed into a rectangle.

8. The pneumatic tire according to claim 1, wherein a shape of each of the compressed portions and the uncompressed portions of the porous material member is formed into a parallelogram.

9. The pneumatic tire according to any one of claims 1 to 4, wherein the porous material member is made of polyurethane foam.

* * * * *